Feb. 27, 1962 R. B. KOCH 3,023,033
TUBE CONNECTOR HAVING ELASTIC DEFORMATION MEANS
Filed Jan. 3, 1958
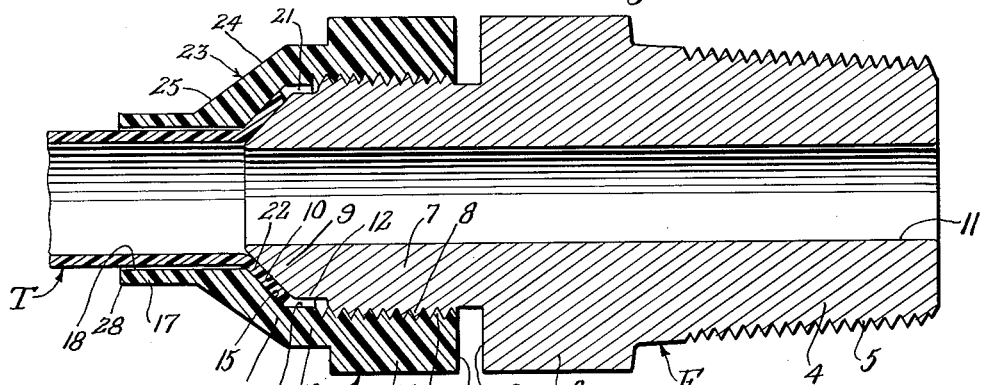
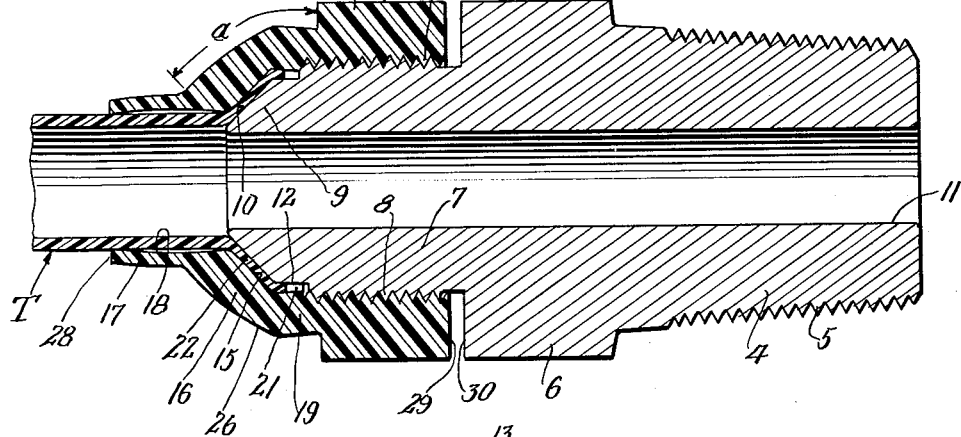
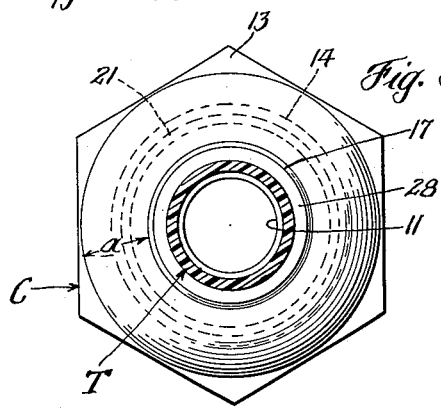
INVENTOR
Robert B. Koch
BY
Synnestvedt & Lechner
ATTORNEYS

United States Patent Office 3,023,033
Patented Feb. 27, 1962

3,023,033
TUBE CONNECTOR HAVING ELASTIC DEFORMATION MEANS
Robert B. Koch, Reading, Pa., assignor to The Polymer Corporation, a corporation of Pennsylvania
Filed Jan. 3, 1958, Ser. No. 706,946
2 Claims. (Cl. 285—187)

This invention relates to a connector for coupling plastic tubing to a fitting. More particularly, the invention is concerned with connecting a flared end of a piece of plastic tubing to a male fitting of the kind terminating in a frusto-conical tip, and for this purpose the invention provides a connector adapted to interfit with both the flared end of the tubing and the male fitting.

Specifically, the invention relates to a plastic flare nut for use in coupling plastic tubing having a flared end to a fitting of the kind having an externally threaded cylindrical portion terminating in a frusto-conical tip.

The invention is of utility in effecting good quality connections between tubing made of various kinds of plastic and fittings made of various materials, including metals and plastics. In effecting such connections the invention employs a connector or flare nut which may be made of a number of different plastic materials. The invention is especially directed to a connector made of a relatively hard plastic material capable of substantial elastic deformation and having a coefficient of thermal expansion substantially the same as that of the flared end on the tubing, and most especially to a connector made of the high melting synthetic linear polyamide materials commonly known as "nylon," such as polyhexamethylene adipamide, polyhexamethylene sebacamide and polymerized epsilon aminocaproic acid (caprolactam).

The primary object of the invention is the provision of a connector which effects a pressure-tight coupling of a piece of plastic tubing and a fitting, which coupling remains pressure tight even after the assembled parts are subjected to elevated temperature.

Another object of the invention is the provision of a flare nut made of a material capable of substantial elastic deformation and having a coefficient of thermal expansion substantially the same as that of the flared end of the plastic tubing which is to be coupled to a fitting.

Yet another object of the invention is the provision of a connector having an internal frusto-conical surface adapted to cooperate with a like surface on a fitting in gripping the flared end of a piece of tubing, the connector having a wall thickness of reduced section surrounding the internal frusto-conical surface whereby to provide for a concentration of stress during tightening of the connector on the fitting and localize the deformation.

Still further, the invention has as an object the provision of coupling means adapted to effect a satisfactory connection of plastic tubing to a common variety of metallic fitting so that a pressure-tight connection is effected between the plastic parts of a fluid pressure system and the metallic parts thereof, this object further encompassing the provision of such a connection which will remain satisfactory even after the temperature of the assembly is raised substantially.

Other objects and advantages of the invention will be clear from the following description referring to the drawing in which:

FIGURE 1 is a longitudinal sectional view showing a piece of tubing, a fitting and the connector of the invention in assembled relation before the connector is tightened on the fitting;

FIGURE 2 is a view similar to FIGURE 1 showing the parts after the connector has been tightened on the fitting and showing the deformation of the flared end of the tubing and of the connector which takes place during normal tightening; and FIGURE 3 is an end view of the assembly shown in FIGURE 2, this view being from the left toward the free end of the tubing.

Stated generally, the fitting F and connector C interfit so as to grip the tubing T.

The fitting F is of the conventional kind having a rear portion 4 including an external tapered thread 5, a hexagonal central or nut portion 6, and a cylindrical portion 7 which is externally threaded as at 8 and which terminates in a tip 9 having a generally frusto-conical surface 10. The cylindrical bore 11 of the fitting extends throughout the length thereof and is of a diameter comparable to the internal diameter of tubing T. The fitting has a relatively short cylindrical portion 12 of diameter approximately equal to, or somewhat less than, the root diameter of the thread 8.

The connector or flare nut C has a hexagonal portion 13, an internal thread 14 adapted to accommodate the thread 8 of the fitting, and an internal frusto-conical surface 15 adjacent the thread 14. This surface 15 is complementary to the frusto-conical surface 10 of the fitting when the fitting and connector are assembled. Stated in another way, the flare nut of the invention has a main body 13 and an axially extending annular flange or shank 16.

A concentric generally cylindrical collar 17 extends axially from the nut and has an internal surface 18 of diameter slightly larger than the outside diameter of the tubing T. The fit between the tubing T and the collar 17 is preferably somewhat loose to aid in ready assembly of the connector on the tubing, normal manufacturing tolerances providing for a play between the connector and tubing of from about .005" to about .010".

The flare nut C has a short cylindrical portion 19 which surrounds, after assembly of the nut on the fitting, the cylindrical portion 12 of the fitting tip and which has an internal cylindrical surface or bore 20 between the thread and the larger base of the frusto-conical internal surface of diameter larger than the diameter of the cylindrical portion 12 of the fitting. There is thus provided an annular recess 21 adjacent the larger base of the frusto-conical internal surface into which recess the free edge of the flared end 22 of the tubing T can flow during pinching of the flared end between the frusto-conical surfaces of the nut and fitting.

The flared end portion 22 of tubing T can be cold formed on the tubing, for instance, by the use of a modified form of the kind of flaring tool used to flare the end of ordinary copper or brass tubing.

Attention is now directed to an important aspect of the invention. The thickness of that portion 23 of the wall of the connector C which surrounds the internal frusto-conical surface 15 is of reduced section. Preferably the portion of the wall 23 of minimum section is opposite the larger base of the frusto-conical internal surface, that is, approximately at 24.

The wall 23 is of larger section opposite the smaller base of the frusto-conical internal surface, that is, at 25. I have found that it is especially advantageous to provide for the thinner portion at 24 and the thicker portion at 25 by having the external wall surface in the form of a frusto-conical surface concentric with the internal conical surface and having a cone angle smaller than the cone angle of the internal frusto-conical surface, the cones of the internal and external surfaces being oriented in the same direction.

By the "cone angle" of a frusto-conical surface is meant the total angle at the vertex of the cone which includes that surface. Thus, in FIGURE 1, the cone angle of the frusto-conical surface 10 on the tip of the fitting F is the angle defined by and included between lines extended from opposite sides of the frusto-conical surface in the plane in which the section of FIGURE 1 is taken.

A number of standard fittings F of common variety have a cone angle of about 90°. With such a fitting the invention provides for the use of a frusto-conical internal surface of the nut which also has a cone angle substantially equal to 90°. In this arrangement, using a nut made from nylon, the external frusto-conical surface on the nut has a cone angle of substantially 70°.

The arrangement shown in FIGURE 1 provides a thinner wall portion at 24 opposite the larger bases of the complementary frusto-conical surfaces of the nut and fitting and a thicker wall farther forward toward the collar 17 and approximately opposite the smaller bases of the frusto-conical surfaces. The thinner wall section results in a concentration of stress during tightening of the nut onto the fitting and thus localizes the deformation. In this connection attention is directed to FIGURE 2 which shows the parts after the connector C has been screwed up tight onto the fitting F.

It is apparent from examination of FIGURE 2 that distortion or deformation of the wall of the connector has occurred to some degree all the way from the edge of the hexagonal part 13 opposite the inner end of the thread to the free edge of the collar 17. This deformation will be described in more detail.

As the nut is screwed tighter and tighter onto the fitting, the conical nose of the fitting presses the flared edge 22 of the tubing T tighter and tighter against the frusto-conical internal surface 15 of the nut. This effects a thinning down of the flared portion 22 and forces the free end thereof to flow inwardly into the coupling, specifically into the recess 21 provided for that purpose. Continued tightening forces the wall of the connector to deform outwardly. This bulging initially takes place at about 26.

When the nut is screwd to normal tightness on the fitting so that the parts assume the positions illustrated in FIGURE 2, the wall surrounding the internal frusto-conical surface bulges outwardly virtually throughout its length, that is, virtually throughout the portion indicated by a. Because of concentration of stress at the portion of minimum wall thickness, the bulge will be more pronounced in the region 26 and will be less pronounced in the more forward region adjacent the collar 17.

The bulging or deformation described causes a deformation of the collar 17 in direction to tighten the fit of the collar on the tubing. This is illustrated in FIGURE 2 by the fact that the internal surface 18 of the collar 17 is no longer straight-sided as it is in FIGURE 1 but is now curved somewhat so that the free edge 28 is tighter against the tubing T than in FIGURE 1.

The axial length of the hexagonal portion 13 is preferably selected so as to provide an important safety feature. If the axial length is too short, then the nut could be screwed on to the fitting far enough to either rupture the thinned portion of the wall or to strip the threads before the rear face 29 of the nut would abut the face 30 of the hexagonal portion 6 on the fitting. On the other hand, if the axial length is too long, then, of course, the conical tip on the fitting would not protrude into the socket of the nut far enough to insure a good gripping action against the flared end 22 of the tubing.

The axial length of the hexagonal portion 13 which is illustrated in the drawing, in an arrangement involving the use of a nylon nut to couple nylon tubing to a metal fitting provides for tight engagement of the flared end of the tubing and at the same time guards against rupture or stripping of the threads because, even if the nut is overtightened onto the fitting, beyond what would be considered normal tightening, the surface 29 on the nut would abut the surface 30 on the fitting and stop further tightening before any permanent damage would be done to the nut.

While the drawing illustrates the invention as applied to coupling nylon tubing to a metal fitting by means of a nylon nut, it should be kept in mind that various other combinations of materials are possible within the scope of the invention. The fitting F could be made of any convenient material. The tubing T which can be advantageously coupled by means of the invention can be made of any of a number of plastic materials so long as it has satisfactory elastic deformation properties. The nut or connector C is made of a plastic material which is capable of substantial elastic deformation.

In many applications the coupling of the invention is required to withstand temperature cycling, that is, repeated elevation and depression of temperature. In such applications, the plastic material of the connector C in addition to being capable of substantial elastic deformation, must be able to withstand the temperature cycling without significant loss of strength and must have a coefficient of thermal expansion substantially equal to that of the material of the tubing so that, during the temperature cycling, the expansion and contraction of the flared part of the tubing and the deformed part of the nut will be substantially conjoint.

An advantage of the invention is that the flaring of the end of the tubing T does not have to be precisely controlled within narrow limits. The cone angle of the frusto-conical surface of the flared end of the tubing should not be less than the cone angle of the frusto-conical tip on the fitting. This is because such "under-flaring" might result, during tightening, in axially thrusting the tubing out of the nut instead of compressing the flare against the frusto-conical surface of the nut. However, the cone angle on the flared end of the tube can be somewhat greater than that of the tip of the fitting. Such "over-flaring" is not objectionable. During tightening the flare is merely deformed so as to conform with the frusto-conical surfaces of the fitting and nut. Thus, while under-flaring should be avoided, limited over-flaring is not detrimental.

The plastic flare nut of the invention has a number of advantages in addition to those already mentioned. If it is attemped to couple plastic tubing by means of an ordinary metal flare nut, it has been found that operators in the field cannot readily "feel" when the nut is getting tight. Since metal nuts are strong enough to withstand deformation during tightening, the result is that the flared end of the plastic tubing is either cut right off of the tube by the complementary conical surfaces of a metal nut or else the flared end is forced out of the fitting entirely. Constructing the nut from a material having elastic deformation properties similar to those of the tubing guards against this hazard.

Furthermore, since a metal flare nut screwed onto a metal fitting does not deform during tightening, the angle of turn necessary to effect loosening of the nut from the fitting is quite small. Merely slightly backing the nut off of the fitting will thus crack open the pressure seal of the coupling and lead to leakage. Such slight backing off of the nut from the fitting can sometimes take place during normal use by reason of vibration, jarring, etc.

In contrast, the deformable nut of the invention guards against cracking open of the joint by means of slight rotation of the nut. This is because, in backing the nut of the invention off of a fitting, the nut must be rotated through a substantial angle before the torque needed to continue turning falls off sharply.

To sum up the above, the torque required for unscrewing a metal nut falls off abruptly after a relatively small degree of rotation whereas the torque needed for unscrewing a nut according to the invention falls more gradually during a relatively large degree of rotation.

I claim:

1. For use in coupling tubing made of synthetic resin capable of cold flow, said tubing having a flared end, to a relatively non-deformable fitting of the kind having an externally threaded barrel terminating in a tip the free edge of which is chamfered to provide a frusto-conical tip surface, a flare nut made of a synthetic resin having substantially the physical properties of nylon, said flare nut having an internal thread to accommodate the threaded end of the fitting and having an internal frusto-conical surface of cone angle substantially equal to that of the frusto-conical tip surface, the frusto-conical surfaces of the nut and tip being adapted to clamp therebetween in tight surface contact the flared end of the tubing when the parts are assembled, the wall of the nut surrounding the internal frusto-conical surface having an external concentric frusto-conical surface of cone angle substantially smaller than that of the internal frusto-conical nut surface, the internal and external frusto-conical surfaces of the nut forming a wall of minimum thickness in the region of the larger bases of the frusto-conical nut surfaces and of maximum thickness in the region of the smaller bases of the frusto-conical nut surfaces, said nut having an integral collar extending axially from the portion of the wall having maximum thickness, said collar having a bore of large enough diameter to provide a relatively loose fit with the tubing in the untightened position, the radial thickness of the collar being substantially less than the thickness of the portion of the wall from which the collar extends, the wall section of minimum thickness providing for a concentration of stress during assembly of the nut on the fitting, whereby, during normal tightening of the nut on the fitting, the portion of the nut wall of minimum thickness undergoes outward elastic deformation and the free edge of the collar undergoes inward elastic deformation in direction to tighten the fit of the collar on the tubing, the nut having an annular recess into which the free edge of the flared end of the tubing can flow during assembly.

2. A flare nut according to claim 1 in which the cone angle of the internal frusto-conical nut surface is substantially 90° and in which the cone angle of the external frusto-conical nut surface is substantially 70°.

References Cited in the file of this patent

UNITED STATES PATENTS

| | | |
|---|---|---|
| 931,173 | Zimmerman | Aug. 17, 1909 |
| 2,189,566 | Kreidel | Feb. 6, 1940 |
| 2,366,444 | Dorman | Jan. 2, 1945 |
| 2,414,789 | Anderson | Jan. 28, 1947 |
| 2,439,351 | Thayer | Apr. 6, 1948 |
| 2,545,263 | Corydon | Mar. 13, 1951 |
| 2,735,699 | Chadbourne | Feb. 21, 1956 |
| 2,755,110 | Jacobs | July 17, 1956 |
| 2,863,678 | Gordon | Dec. 9, 1958 |

FOREIGN PATENTS

| | | |
|---|---|---|
| 796,072 | France | Jan. 17, 1936 |